W. J. SCHOONOVER.
ACTUATING MECHANISM FOR WASHING MACHINES.
APPLICATION FILED APR. 5, 1917.
1,323,497.
Patented Dec. 2, 1919.
6 SHEETS—SHEET 1.
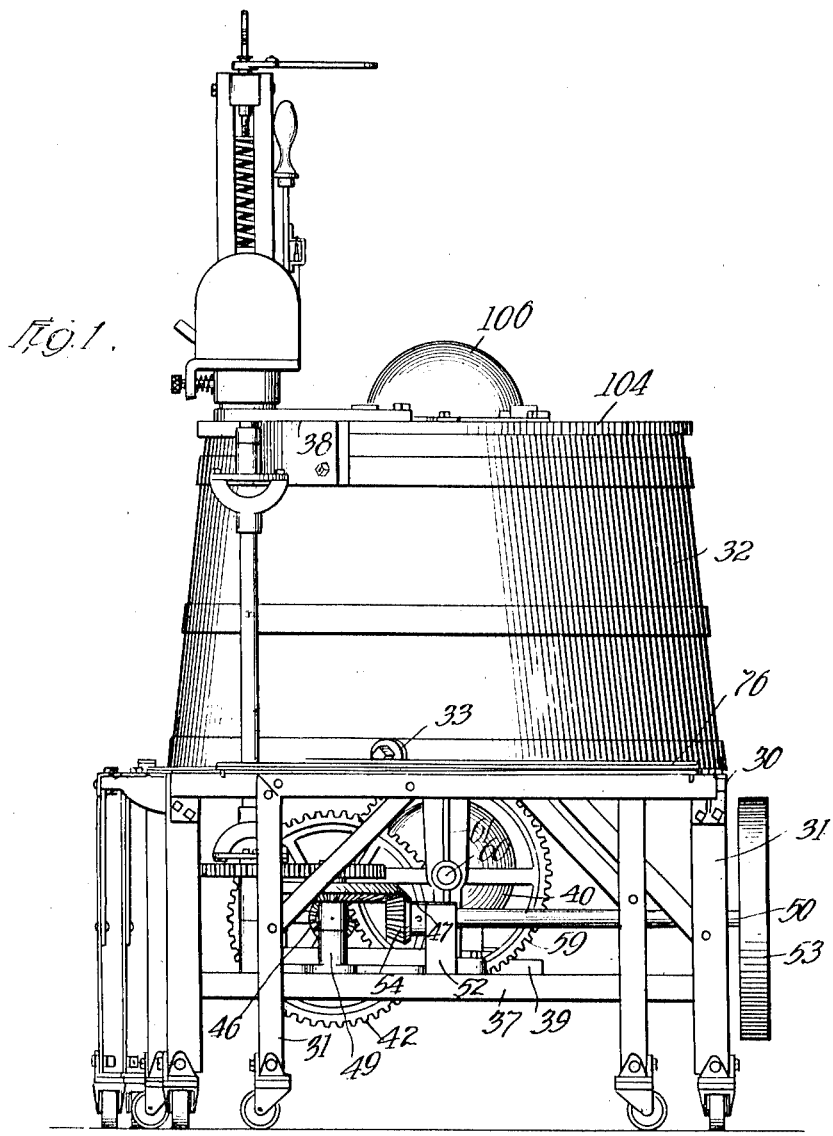

W. J. SCHOONOVER.
ACTUATING MECHANISM FOR WASHING MACHINES.
APPLICATION FILED APR. 5, 1917.
1,323,497.
Patented Dec. 2, 1919.
6 SHEETS—SHEET 2.
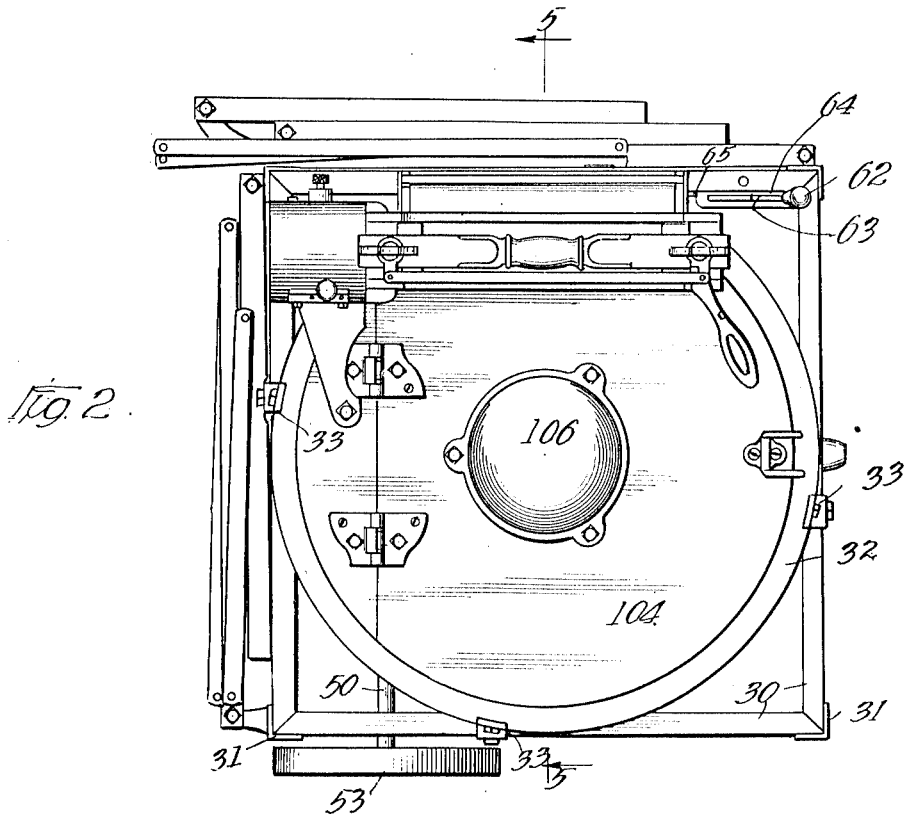
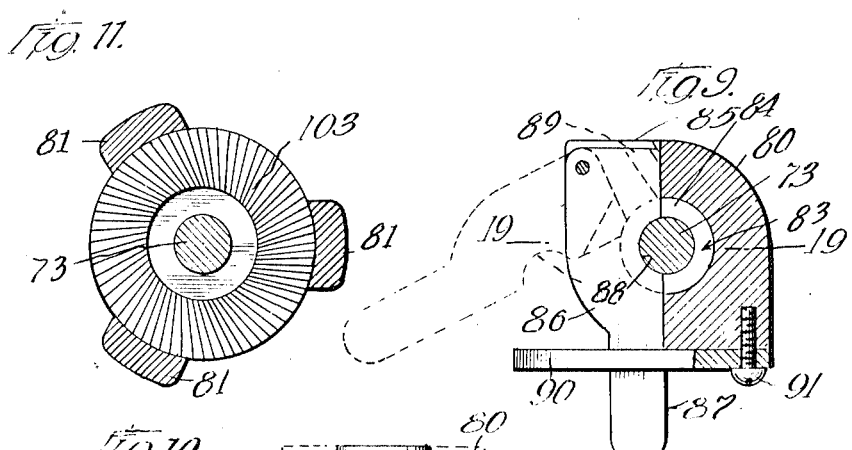
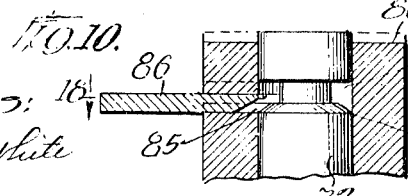

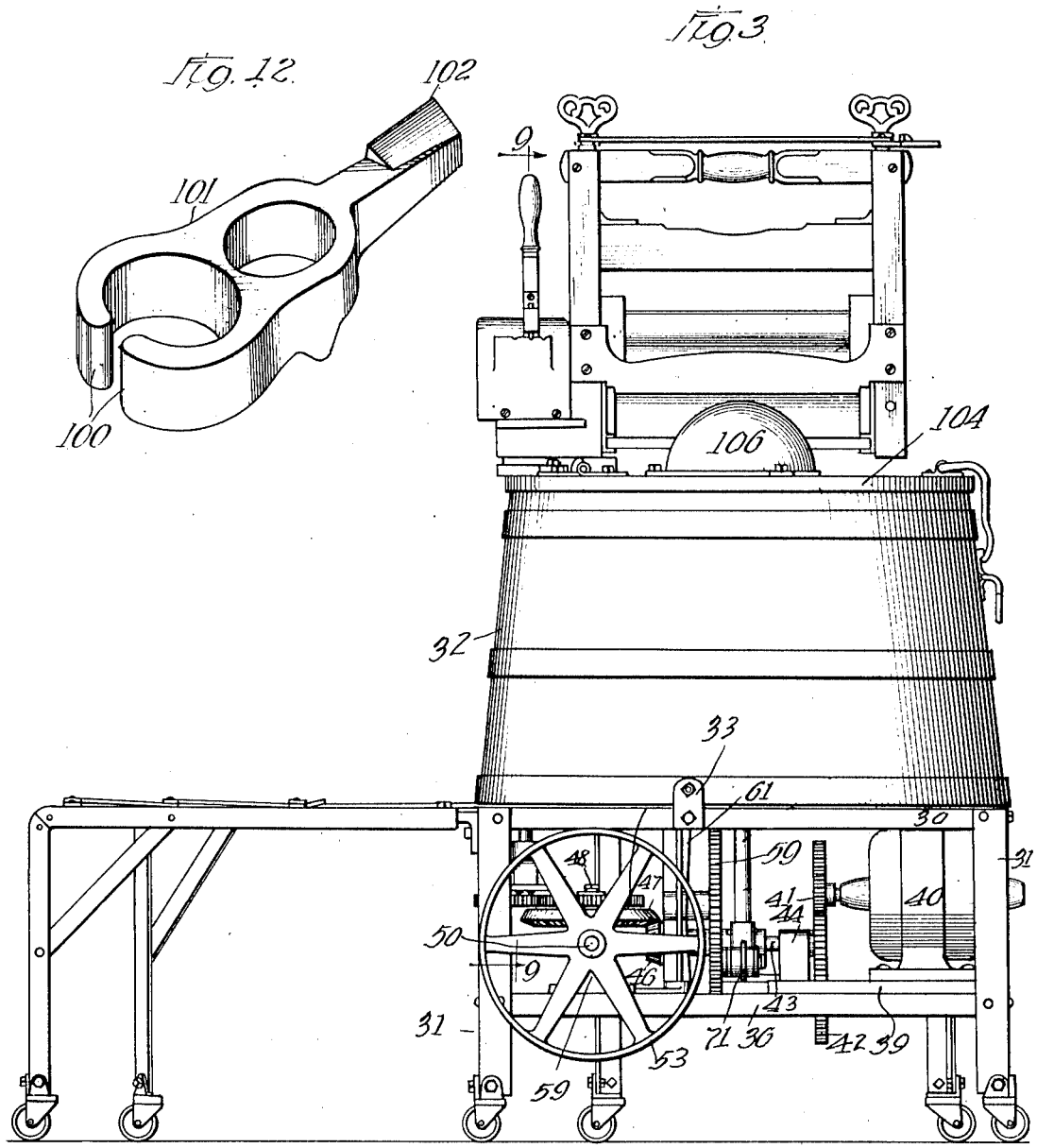

W. J. SCHOONOVER.
ACTUATING MECHANISM FOR WASHING MACHINES.
APPLICATION FILED APR. 5, 1917.
1,323,497.
Patented Dec. 2, 1919.
6 SHEETS—SHEET 4.
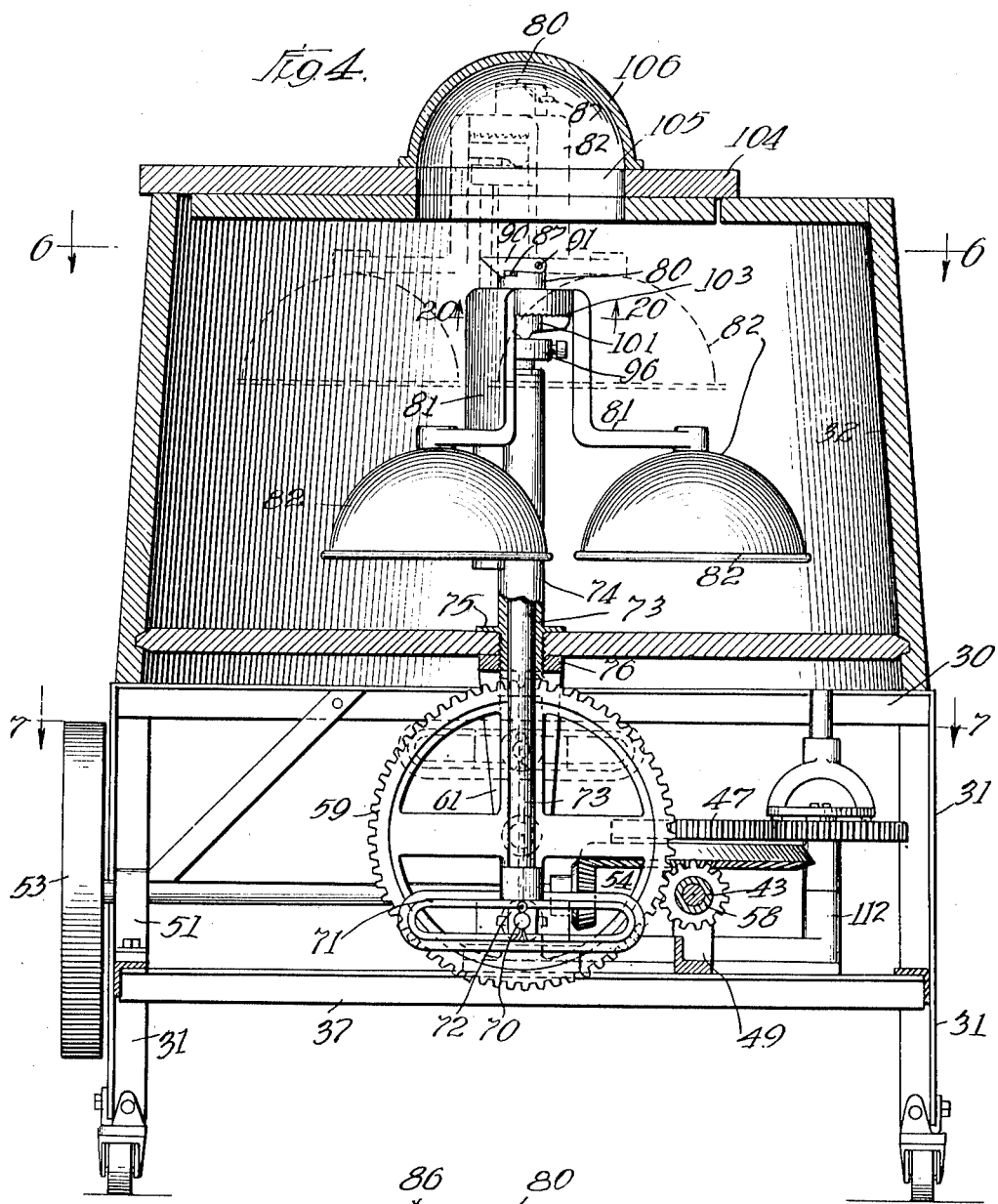
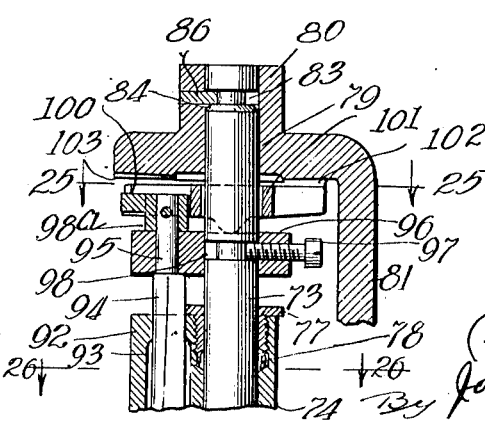

W. J. SCHOONOVER.
ACTUATING MECHANISM FOR WASHING MACHINES.
APPLICATION FILED APR. 5, 1917.
1,323,497. Patented Dec. 2, 1919.
6 SHEETS—SHEET 5.
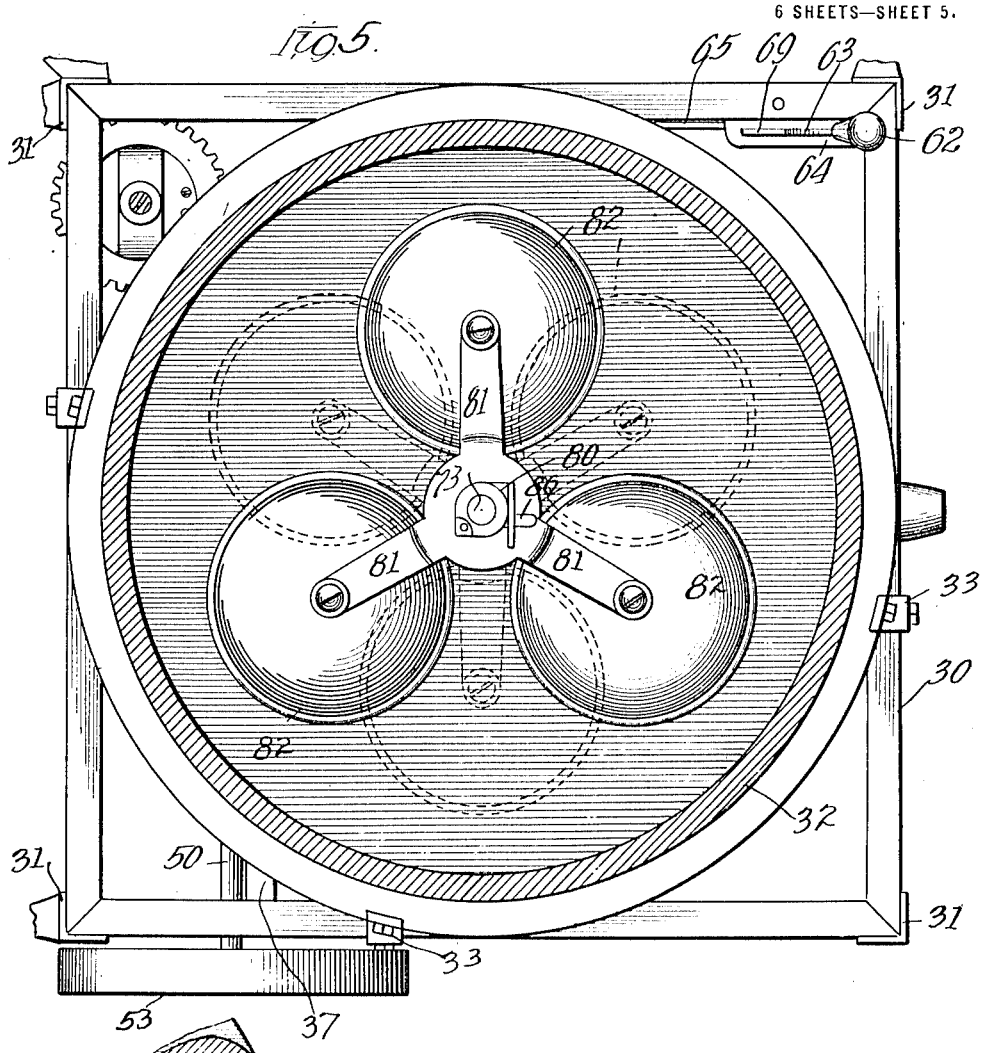
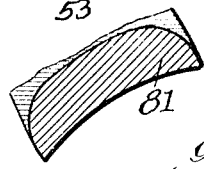
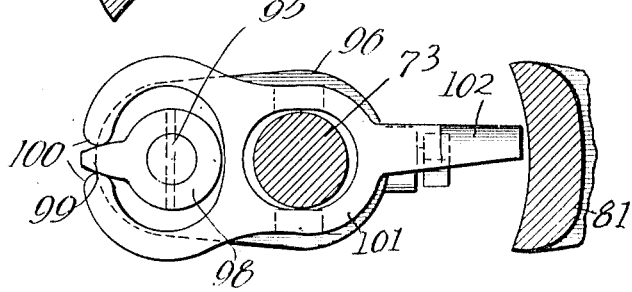
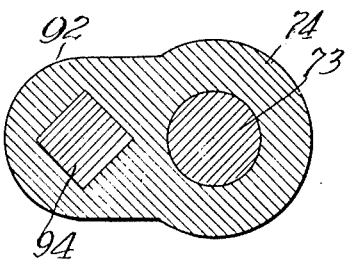

W. J. SCHOONOVER.
ACTUATING MECHANISM FOR WASHING MACHINES.
APPLICATION FILED APR. 5, 1917.
1,323,497.
Patented Dec. 2, 1919.
6 SHEETS—SHEET 6.
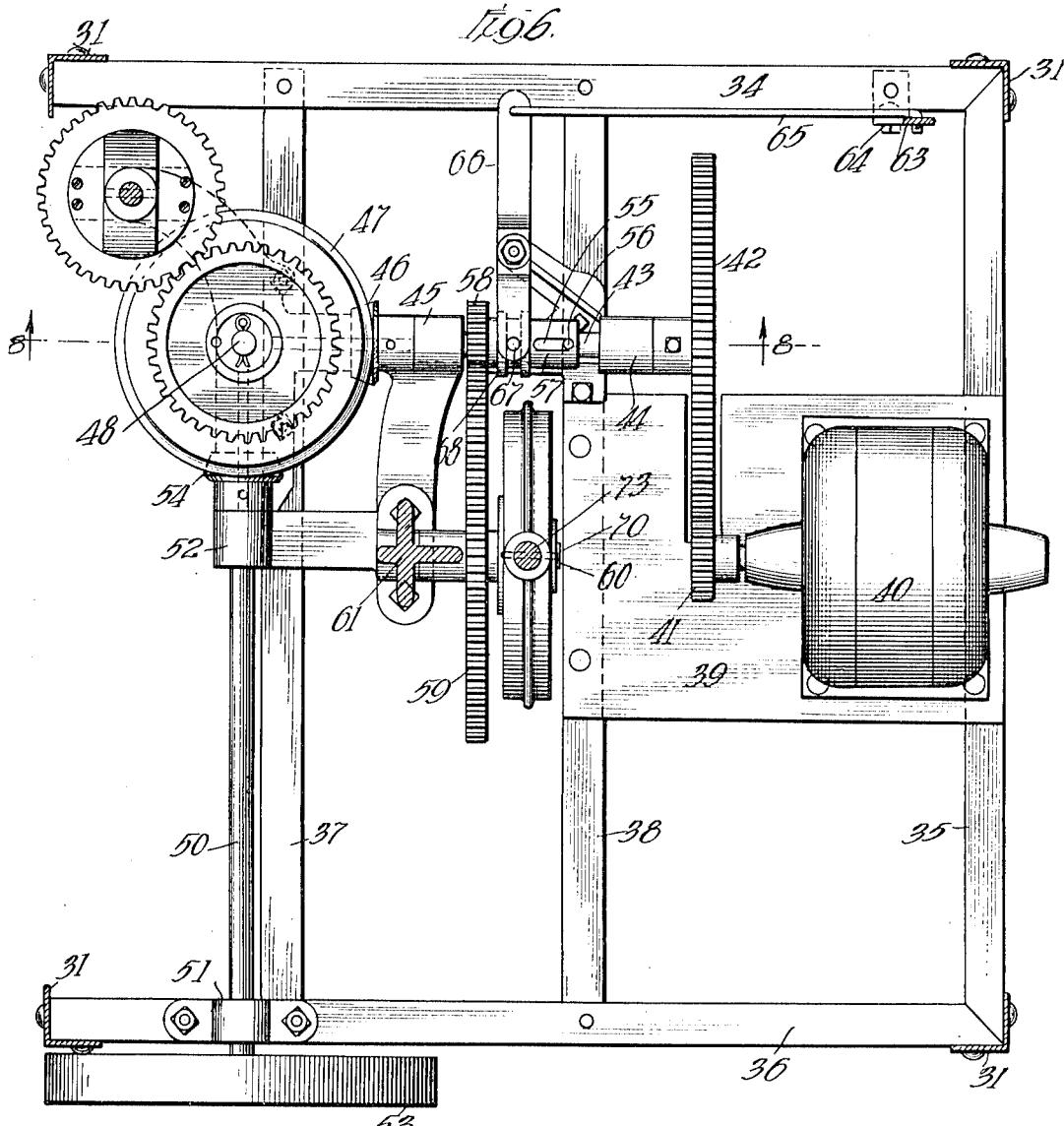
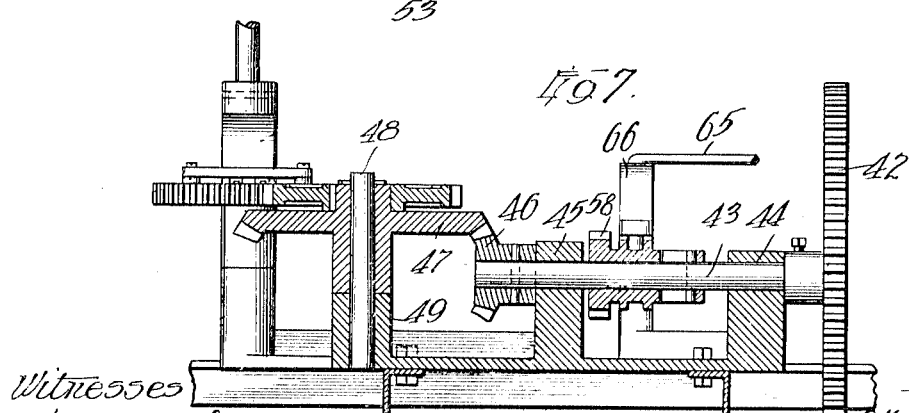

UNITED STATES PATENT OFFICE.

WILLIAM J. SCHOONOVER, OF BELVIDERE, ILLINOIS.

ACTUATING MECHANISM FOR WASHING-MACHINES.

1,323,497.  Specification of Letters Patent.  Patented Dec. 2, 1919.

Application filed April 5, 1917. Serial No. 159,861.

*To all whom it may concern:*

Be it known that I, WILLIAM J. SCHOONOVER, a citizen of the United States, and a resident of Belvidere, in the county of Boone and State of Illinois, have invented certain new and useful Improvements in Actuating Mechanism for Washing-Machines, of which the following is a full, clear, and exact specification.

My invention is concerned with gearing for washing machines of the general type shown in my Patent No. 1,247,726, issued November 27, 1917, and is designed to produce such a gearing that can be driven by power and to which can also be readily connected a wringer gearing, if desired.

My invention is further concerned with certain novel combinations of elements and details of construction, all as will be fully described in the specification, and particularly pointed out in the claims.

To illustrate my invention, I annex hereto six sheets of drawings, in which the same reference characters are used to designate identical parts in all the figures, of which,—

Figure 1 is a side elevation of the machine with the auxiliary support folded;

Fig. 2 is a top plan view with the parts in the same position;

Fig. 3 is a front elevation with the auxiliary frame extended;

Fig. 4 is a view in section, as seen on the line 5—5 of Fig. 2, but with the parts on an enlarged scale;

Fig. 5 is a top plan view as seen in section on the line 6—6 of Fig. 4;

Fig. 6 is a top plan view, on a still larger scale, as seen in section on the line 7—7 of Fig. 4;

Fig. 7 is a detail in section on the line 8—8 of Fig. 6;

Fig. 8 (Sheet 1) is a perspective detail of the mechanism for locking the cup-supporting spider in place;

Fig. 9 (Sheet 2) is a detail of the cup spider locking mechanism, as seen in section on the line 18—18 of Fig. 10;

Fig. 10 is a similar view on the line 19—19 of Fig. 9;

Fig. 11 is a detail in section, on an enlarged scale, as seen on the line 20—20 of Fig. 4;

Figs. 12 and 13 (Sheet 3) are perspective details, on an enlarged scale, showing the portion of the actuating mechanism for rotating the cup-supporting spider;

Fig. 14 (Sheet 4) is a detail of the same mechanism as it would appear on the line 19—19 of Fig. 9; and Figs. 15 and 16 (Sheet 5) are also details of the same mechanism as seen in section on the lines 25—25 and 26—26 of Fig. 14.

In carrying out my invention, I employ a main frame having the preferably square top 30 made up of four pieces of angle iron suitably secured together and having the four angle-iron legs 31 extending downward from the four corners thereof. On the top of this frame is secured the tub 32 of the washing machine, in any suitable manner, as by the plurality of clips 33 secured to the top of the frame and to the tub. Toward the bottom of the frame, I secure a skeleton supporting platform, made up of the three angle irons 34, 35 and 36 (see Fig. 6) secured to the legs 31, and having the cross pieces 37 and 38 secured to the bars 34 and 36. Upon the bars 35 and 38, I secure the supporting plate 39 upon which the electric motor 40 is mounted, when the machine is arranged to be driven by electricity. The armature shaft of the motor has secured on the inner end the spur gear pinion 41 which meshes with the spur gear wheel 42 secured on the shaft 43 journaled in the bearings 44 and 45 suitably supported on the stationary framework. On the other end of the shaft 43 is secured a bevel pinion 46 which meshes with a bevel gear wheel 47 journaled on a stud shaft 48 suitably supported from the bearing socket 49, as best seen in Fig. 7. Where the machine is to be driven by a belt from a gasolene or other motor, I provide a shaft 50 in the plane of the shaft 43, but extending at right angles thereto, and journaled in the bearings 51 and 52 also suitably supported from the framework, and having on its outer end the belt wheel 53, and on its inner end the bevel pinion 54 likewise meshing with the bevel gear wheel 47, so that whichever motor is running, the bevel gear wheel 47 will be rotated to drive the wringer mechanism by the gearing to be subsequently described.

Slidingly mounted upon the shaft 43, but splined thereto by the slot 55 and the pin 56, is a sleeve 57, which has on one end the spur gear pinion 58, which is adapted to mesh with the spur gear wheel 59 journaled on a suitable horizontal bearing stud 60 projecting horizontally inwardly from the downwardly extending bracket 61, seen in section in Fig. 6. To throw the pinion 58 into and out of mesh with the wheel 59 to start and stop the washing machine, I provide the handle 62, seen in Figs. 1 and 5, secured to the lever 63 fulcrumed on the framework at 64, as seen in Fig. 6, and connected by a link 65 with the shifting lever 66 having the forked inner end provided with the pair of pins 67 in the open end of the fork extending into the annular channel 68 formed on the sleeve 57. By shifting the lever 62, which is guided by the slotted segment 69, seen in Fig. 2, from one extreme to the other, the pinion 58 can be thrown into and out of mesh with the gear wheel 59, in spite of the fact that it is rotating, being driven at a comparatively slow rate of speed by the motor 40. It will of course be obvious that the pinion 58 will also be rotated through the train of gearing from the belt wheel 53, if another form of motor is employed.

The spur gear wheel 59 has projecting inwardly therefrom the eccentric bearing pin 70, which coöperates with the horizontal slot formed in the cross head 71 (see Fig. 4), the pin 70 preferably being provided with the square bearing block 72 journaled thereon, which engages the upper and lower edges of the horizontal slot in the cross head 71. This cross head is rigidly secured to the lower end of the vertically reciprocating shaft 73, which, as best shown in Fig. 4, reciprocates through the elongated vertical bearing sleeve 74 extending upward through the bottom of the tub 32, it having the flange 75 resting on the upper side of the bottom, and the threaded lower portion extending through the bottom of the tub to be engaged by the nut 76, by which the sleeve 74 is quickly and easily secured in place. The upper end of this sleeve 74, as seen in Fig. 14, is provided with the stuffing nut 77 and the packing 78, so that none of the water in the tub can possibly get down through the bearings to the mechanism below the tub and rust the same. It will be obvious that this shaft 73 will, by the connections so far described, be reciprocated up and down once at each rotation of the spur gear wheel 59.

Loosely mounted on the top of the shaft 73 is the spider 79, having the hub 80 and the three arms 81, on the outer end of each of which is secured the vacuum cup 82, which, as it is raised and lowered, coöperates with the clothes in the tub in the manner customary with this class of machines.

To secure the spider detachably on the top of the shaft 73, I provide the annular groove 83 therein having the inclined lower face 84, and in a horizontal slot 85 in the hub (see Figs. 8, 9, 10 and 14) I pivot the locking lever 86, shown attached and in perspective in Fig. 8, which has the handle portion 87, the semicircular recess 88 to enter the groove 83, and the bevel corner 89, which first engages the bevel surface 84 of the groove 83 and cams the hub up into place, as the lever 86 is swung into position. When it is in the position shown in full lines in Fig. 9, it is locked by the vertically swinging locking lever 90, which is pivoted at 91 to a flat side of the hub 80, the under surface of the lever 90 being provided with a single notch to engage the handle 87 of the lever 86. By the connections shown, the spider can be quickly attached or detached, and yet be held locked so as to rotate freely in a certain fixed position on the upper end of the shaft 73, as is necessary in the operation of the machine.

To rotate the spider 79 through a few degrees at each reciprocation, so that the cups will engage the clothes at each reciprocation and also tend to rub them over the bottom, I provide the mechanism shown in Figs. 11, 12, 13, 14, 15 and 16, where it will be seen that the sleeve 74 is provided with an offset portion 92, having a vertical tubular passage 93 therein, the upper end of which passage is square in cross section, as seen in Fig. 16, and receives the squared lower portion 94 of the vertical shaft 95, the reduced portion of which is journaled in the bearing formed in the outer end of the oblong collar 96 which is secured at a fixed height on the shaft 73 by the set screw 97 threaded therethrough and entering the annular channel 98 formed in the shaft 73, it being vital to the perfect operation of the machine that this collar 96 have a fixed place on the shaft 93. The upper end of the shaft 95 has rigidly secured thereon the collar 98ª (see Figs. 13 and 15) having the lug 99 thereon, which lug coöperates with the abutments 100 formed on the outer ends of the yoke piece 101 (see Figs. 12 and 15), which is loosely journaled on the shaft 73 above the collar 96. The rear end of this yoke piece 101 is provided with the ratchet dog 102, which is adapted to engage the ratchet teeth 103 (see Fig. 11) formed on the under face of the hub 80 of the spider 79. The squared portion 94 of the shaft 95 is given a twist of a few degrees, with the result that, as the shaft 73 is raised and lowered, the shaft 95 is rocked through a few degrees by reason of the twist on the squared portion of the shaft 93. The lug 99 being thus rocked, in turn rocks the yoke piece 101, and the ratchet dog 102 thereof engaging the teeth 103 serves to advance the spider a few degrees in one direction at each reciprocation of the shaft 73, thus securing the desired combined vertical reciprocation and step-by-step rotation in one direction of the spider carrying the vacuum cups. The lid 104 of the tub is hinged thereon in the customary manner, and is preferably provided with the opening 105 through the center thereof, covered by the hollow cap 106, through which opening the upper end of the spider can pass as the machine is operated.

While I have shown my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with a shaft, of a spider mounted to rotate on the shaft, an annular groove in said shaft, a latch pivoted on the hub of the spider and adapted to enter the annular groove and a second latch coöperating with the first to hold it in the groove, said annular groove having its lower portion first engaging the groove formed with a bevel to coöperate with the beveled face.

2. In a device of the class described, the combination with a shaft, of a spider mounted to rotate on the shaft, an annular groove in the shaft having its lower face beveled, a latch pivoted on the hub of the spider having the fulcrum at one corner of its end and a semicircular groove on the inner side to engage the shaft within its annular groove and its corners between the fulcrum and the semicircular groove beveled to coöperate with the beveled surface of the groove, and a second latch coöperating with the first to hold it in the groove.

3. In a device of the class described, the combination with a support, of a vertical bearing sleeve extending therethrough, a shaft mounted to reciprocate lengthwise in the sleeve, means connected with the lower end thereof for reciprocating the same, a spider mounted to rotate on the upper end of the shaft, and means interposed between the shaft and the spider to rotate the latter step by step as the shaft reciprocates, said means comprising ratchet teeth on the under face of the hub of the spider, a collar secured on the shaft beneath the hub, a rock shaft journaled in the collar, connections between the sleeve and the rock shaft to swing the latter as the vertically reciprocating shaft rises and falls, a lug secured on the top of the rock shaft, and a forked actuating lever fulcrumed on the vertically-reciprocating shaft and the collar, and having the ratchet tooth at one end to engage the ratchet teeth on the hub, and the fork at the other end engaged by the lug on the top of the rock shaft.

4. In a device of the class described, the combination with a support, of a vertical bearing sleeve extending therethrough, a shaft mounted to reciprocate lengthwise in the sleeve, means connected with the lower end thereof for reciprocating the same, a spider mounted to rotate on the upper end of the shaft, and means interposed between the shaft and the spider to rotate the latter step by step as the shaft reciprocates, said means comprising ratchet teeth on the under face of the hub of the spider, a collar secured on the shaft beneath the hub, a rock shaft journaled in the collar, connections between the sleeve and the rock shaft to swing the latter as the vertically reciprocating shaft rises and falls, an outwardly extending lug secured on the top of the rock shaft, and a forked actuating lever on the vertically reciprocating shaft and the collar, and having a ratchet tooth at one end to engage the ratchet teeth on the hub, and the fork at the other end having the inwardly directed arms engaged by the lug on the top of the rock shaft.

5. In a device of the class described, the combination with a support, of a vertical bearing sleeve extending therethrough, a shaft mounted to reciprocate lengthwise in the sleeve, means connected with the lower end thereof for reciprocating the same, a spider mounted to rotate on the upper end of the shaft, and means interposed between the shaft and the spider to rotate the latter step by step as the shaft reciprocates, said means comprising ratchet teeth on the under face of the hub of the spider, a collar secured on the shaft beneath the hub, a rock shaft journaled in the collar, connections between the sleeve and the rock shaft to swing the latter as the vertically reciprocating shaft rises and falls, a lug secured on the top of the rock shaft, and a forked actuating lever loosely journaled on the reciprocating shaft and having a pair of fulcrumed lugs on its under side engaging the top of the collar, and having a ratchet tooth at one end to engage the ratchet teeth on the hub and a fork at the other end engaged by the lug on the top of the rock shaft.

6. In a device of the class described, the combination with a support, of a vertical bearing sleeve extending therethrough, a shaft mounted to reciprocate lengthwise in the sleeve, means connected with the lower end thereof for reciprocating the same, a spider mounted to rotate on the upper end of the shaft, and means interposed between the shaft and the spider to rotate the latter step by step as the shaft reciprocates, said means comprising ratchet teeth on the underface of the hub of the spider, a collar on the shaft beneath the hub covering an annular groove in the vertically reciprocating shaft, a set screw in the collar entering the groove, a rock shaft journaled in the collar, connections between the sleeve and the rock shaft to swing the latter as the vertically reciprocating shaft rises and falls, an outwardly extending lug secured on the top of the rock shaft, and a forked actuating lever fulcrumed on the vertically reciprocating shaft and the coullar, and having a ratchet tooth at one end to engage the ratchet teeth on the hub, and the fork at the other end having the inwardly directed arms engaged by the lug on the top of the rock shaft.

7. In a device of the class described, the combination with a receptacle, of a frame upon which to support it, a pair of horizontal shafts at right angles to each other journaled therein, separate driving means on the outer end of each of said shafts, a bevel gear wheel on a vertical axis, a bevel pinion on the inner end of each of said shafts meshing with the bevel gear wheel, a clutch sleeve splined on one of said shafts, a rotating clutch member with which it coöperates to start and stop the machine, means for shifting the clutch sleeve, a reciprocating member in the receptacle, and gearing connecting the rotating clutch member and the reciprocating member to transform the rotary motion of the clutch member to the reciprocating motion of the member in the receptacle.

8. In a device of the class described, the combination with a receptacle, of a frame upon which to support it, a pair of horizontal shafts at right angles to each other journaled therein, separate driving means on the outer end of each of said shafts, a bevel gear wheel on a vertical axis, a bevel pinion on the inner end of each of said shafts meshing with the bevel gear wheel, a clutch sleeve splined on one of said shafts and having a gear pinion thereon, a rotating clutch gear-wheel coöperating with the pinion to start and stop the machine, means for shifting the clutch sleeve to engage and disengage the pinion with the clutch gear-wheel, a reciprocating member in the receptacle, and gearing connecting the clutch gear-wheel and the reciprocating member to transform the rotary movement of the wheel to the reciprocating movement of the member in the receptacle.

9. In a device of the class described, the combination with a receptacle, of a frame upon which to support it, a pair of horizontal shafts at right angles to each other journaled therein, separate driving means on the outer end of each of said shafts, a bevel gear wheel on a vertical axis, a bevel pinion on the inner end of each of said shafts meshing with the bevel gear wheel, a clutch splined on one of said shafts and having a gear pinion thereon, a rotating clutch gear wheel coöperating with the pinion to start and stop the machine, means for shifting the clutch sleeve to engage and disengage the pinion with the clutch gear wheel, a reciprocating member in the receptacle, gearing connecting the clutch gear wheel and the reciprocating member to transform the rotary movement of the wheel to the reciprocating movement of the member in the receptacle, a spider journaled on the top of the reciprocating member, cups carried by the spider, and means to rotate the spider at each reciprocation of the member on which it is journaled.

In witness where I have hereunto set my hand and affixed my seal this 23d day of March, A. D. 1917.

WILLIAM J. SCHOONOVER. [L. S.]

Witness:
JOHN HOWARD McELROY.